United States Patent
Ohnishi et al.

(10) Patent No.: US 6,207,301 B1
(45) Date of Patent: Mar. 27, 2001

(54) POLYMER FLUORESCENT SUBSTANCE AND ORGANIC ELECTROLUMINESCENCE DEVICE

(75) Inventors: Toshihiro Ohnishi; Takanobu Noguchi; Shuji Doi, all of Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 08/912,336

(22) Filed: Aug. 18, 1997

(30) Foreign Application Priority Data

Aug. 21, 1996 (JP) .................................................. 8-220068

(51) Int. Cl.[7] ............................. H05B 33/14; C08G 61/00
(52) U.S. Cl. ......................... 428/690; 428/917; 313/504; 313/506; 528/230; 528/244; 528/373; 528/397
(58) Field of Search ..................................... 428/690, 691, 428/917, 704; 313/504, 506; 528/129, 153, 154, 230, 244, 247, 373, 397

(56) References Cited

FOREIGN PATENT DOCUMENTS

| | | |
|---|---|---|
| 0-443861 | 8/1991 | (EP) . |
| 0637621 | 2/1995 | (EP) . |
| 0725120 | 8/1996 | (EP) . |
| 57-51781 | 3/1982 | (JP) . |
| 59-194393 | 11/1984 | (JP) . |
| 63-70257 | 3/1988 | (JP) . |
| 63-175860 | 7/1988 | (JP) . |
| 2-135359 | 5/1990 | (JP) . |
| 2-135361 | 5/1990 | (JP) . |
| 2-209988 | 8/1990 | (JP) . |
| 3-37992 | 2/1991 | (JP) . |
| 3-152184 | 6/1991 | (JP) . |
| 90 13148 | 11/1990 | (WO) . |
| 90 20589 | 9/1994 | (WO) . |
| WO9420589 | 9/1994 | (WO) . |

OTHER PUBLICATIONS

N. Greenham et al., "Efficient Light–Emitting Diodes Based on Polymers with High Electron Affinities", Letters of Nature, vol., 365, Oct. 14, 1993, pp. 628–630.

P. Burn et al., "Chemical Tuning of Electroluminescent Copolymers to Improve Emission Efficiencies and Allow Patterning", Letters of Nature, vol. 356, Mar. 5, 1992, pp. 47–49.

Z. Yang et al., "A Soluble Blue–Light–Emitting Polymer", Communications to the Editor, Macromolecules, vol. 26, No. 5, 1993, pp. 1188–1190, (No Month).

G. J. Sarnecki et al., "The Synthesis and Characterisation of Some Poly(2,5–dialkoxy–1,4–phenylene vinylene)s", Synthetic Metals, 55–57 (1993), pp. 914–917, (No Month).*

Herman F. M. Schoo et al., "Organic Polymer LEDs with mobile and immobile ions", Polymer Preprints, vol. 38, No. 1, Apr. 1997, pp. 337–338.*

Horst Vestweber et al., "Progress Towards Processible Materials for Light–Emitting Devices Using Poly(p–phenyl–phenylenevinylene)", Advanced Materials, vol. 4, No. 10. Oct. 1992, pp. 661–662.

* cited by examiner

Primary Examiner—Marie Yamnitzky
(74) Attorney, Agent, or Firm—Sughrue, Mion, Zinn, Macpeak & Seas, PLLC

(57) ABSTRACT

A polymeric fluorescent substance having visible fluorescence in a solid state and a polystyrene-reduced number-average molecular weight of $10^3$ to $10^7$, which contains at least one repeating unit represented by the following formula (1), $$—Ar_1—CR_1=CR_2— \qquad (1)$$

wherein the sum of the repeating unit is from 10 to 100 mol % of the total number of the repeating units, $Ar_1$ represents an arylene group having 4 to 20 carbon atoms taking part in conjugated bonds and containing at least one substituent represented by the following formula (2) as a nuclear substituent, or a heterocyclic compound group, having 4 to 20 carbon atoms taking part in conjugated bonds, and containing at least one substituent represented by the following formula (2) as a nuclear substituent; and $R_1$ and $R_2$ independently represent a group selected from the group consisting of hydrogen, an alkyl group having 1 to 20 carbon atoms, an aryl group having 6 to 20 carbon atoms, a heterocyclic compound group having 4 to 20 carbon atoms and a cyano group, $$—(X)_m—(CH_2)_n—Ar_2 \qquad (2)$$

wherein $Ar_2$ represents a group selected from the group consisting of an aryl group and having 4 to 20 carbon atoms taking part in conjugated bonds, a heterocyclic compound group, having 4 to 20 carbon atoms taking part in the conjugated bonds, and an aliphatic cyclic hydrocarbon compound group having 6 to 20 carbon atoms constituting the ring; X represents O or S; m represents 0 or 1; and n represents an integer of 2 to 10. The polymeric fluorescent substance is excellent as a material for organic EL devices because of strong fluorescence and good thermal stability. Furthermore, an organic EL device using the polymeric fluorescent substance can be preferably used as a flat light source for back light or a device such as a flat panel display and the like because it is easily produced and exhibits excellent light emitting characteristics and a heat resistance.

5 Claims, No Drawings

POLYMER FLUORESCENT SUBSTANCE AND ORGANIC ELECTROLUMINESCENCE DEVICE

BACKGROUND OF THE INVENTION

1. Field of the Invention

The present invention relates to a polymeric fluorescent substance, and an organic electroluminescence device (hereinafter referred to as an "organic EL device") produced by using the polymeric fluorescent substance.

2. Description of the Related Art

An inorganic electroluminescence device using an inorganic fluorescent substance as a light emitting material (which may hereinafter referred to as an "inorganic EL device") has been used, for example, as a flat light source for back light or a display device such as a flat panel display and the like, however, high A.C. voltage has been required to emit light.

In view of the improvement of inorganic EL devices, a device having a double-layer structure comprising a light emitting layer of an organic fluorescent pigment and a layer of an organic charge transporting compound (Japanese Patent Kokai (Laid-Open) No. 59-194393) and a device comprising a polymer as a light emitting material (WO-A-9013148, Japanese Patent Kokai (Laid-Open) No. 3-244630) have been reported. These electroluminescence devices use organic materials having advantageous features so that low-voltage direct current drive, high luminance and multi-color light emission can be obtained easier than inorganic EL devices.

Polymeric light emitting materials which have hitherto been reported, as WO-A-9013148 discloses a poly-p-phenyene vinylene thin film prepared by forming a soluble precursor film on an electrode and subjecting the film to a heat treatment to convert it into a conjugated polymer. Japanese Patent Kokai No. 3-244630 discloses a conjugated polymer having a feature that is soluble in a solvent and does not require a heat treatment, such as poly-2,5-dialkoxy-p-phenylene vinylene and the like. Furthermore, Japanese Patent Kohyo -510483 discloses a poly-p-phenylene vinylene copolymer having a cholestanoxy group as a nuclear substituted side chain, which has good solubility.

Alternatively, as polymeric light emitting materials, a polymeric fluorescent substance containing a conjugated segment and a non-conjugated segment in a molecule and a poly-p-phenylene vinylene derivative wherein a cyano group is connected with a vinylene group are reported [Nature, Vol. 365, page 628 (1993)]. Examples of the polymeric fluorescent substance containing a conjugated part and a non-conjugated part in a molecule include a random copolymer of a 2,5-dimethoxy-p-phenylene ethylene structure and p-phenylene vinylene [Nature, Vol. 356, page 47 (1992)] and a polymer wherein a phenylene vinylene structure and an aliphatic hydrocarbon are connected with an ether linkage [Macromolecules, Vol. 26, page 1188 (1993)].

However, the poly(arylene vinylene) type polymeric fluorescent substance used in organic EL devices, which has hitherto been reported, must be subjected to a heat treatment when passing through a solvent-soluble precursor. Therefore, there was a limitation that only a substrate having a high heat resistance can be used. In order to obtain a solvent-soluble polymeric fluorescent substance, it is necessary to introduce a flexible repeating unit into a main chain or to introduce a flexible side chain having a high solvent affinity. As a result, there was a problem with a low heat resistance in the device because the polymeric fluorescent substance is susceptable to be softened at high temperature.

When an alkyl group or an alkoxy group is contained in a side chain, as the side chain length increses, the quantum yield of fluorescence becomes higher but the softening temperature becomes lower. Therefore, it is difficult to simultaneously satisfy a high efficiency and a high heat resistance. As described above, there is required a material which has a high quantum yield of fluorescence and a high light emitting efficiency of organic EL devices and is thermally stable.

Under these circumstances, the present inventors have intensively studied so as to further improve the light emitting efficiency, the heat resistance and the lifetime of the organic EL device by using a polymeric fluorescent substance in a light emitting layer. As a result, it has been found that a polymeric fluorescent substance having a specific structure at the side chain exhibits a high quantum yield of fluorescence and a high heat resistance, and an organic EL device can be easily produced using said polymeric fluorescent substance by coating it and, furthermore, this organic EL device exhibits a high light emitting efficiency, a high heat resistance and a long lifetime.

SUMMARY OF THE INVENTION

The object of the present invention is to provide a solvent-soluble polymeric fluorescent substance which has a strong fluorescence and an excellent heat resistance, and an organic EL device having a high light emitting efficiency, a high heat resistance and a long lifetime, which can be easily produced by coating said polymeric fluorescent substance.

That is, the present invention relates to [1] a polymeric fluorescent substance having visible fluorescence in a solid state and a polystyrene-reduced number-average molecular weight of $10^3$ to $10^7$, which contains at least one repeating unit represented by the following formula (1),

$$—Ar_1—CR_1=CR_2— \quad (1)$$

wherein the sum of the repeating unit is from 10 to 100 mol % of the total number of the repeating units, $Ar_1$ represents an arylene group having 4 to 20 carbon atoms taking part in conjugated bonds and containing at least one substituent represented by the following formula (2) as a nuclear substituent, or a heterocyclic compound group having 4 to 20 carbon atoms taking part in conjugated bonds, and containing at least one substituent represented by the following formula (2) as a nuclear substituent; and $R_1$ and $R_2$ independently represent a group selected from the group consisting of hydrogen, an alkyl group having 1 to 20 carbon atoms, an aryl group having 6 to 20 carbon atoms, a heterocyclic compound group having 4 to 20 carbon atoms and a cyano group,

$$—(X)_m—(CH_2)_n—Ar_2 \quad (2)$$

wherein $Ar_2$ represents a group selected from the group consisting of an aryl group having 4 to 20 carbon atoms taking part in conjugated bonds, a heterocyclic compound group having 4 to 20 carbon atoms taking part in conjugated bonds, and an aliphatic cyclic hydrocarbon compound group having 6 to 20 carbon atoms constituting the ring; X represents O or S; m represents 0 or 1; and n represents an integer of 2 to 10.

In addition, the present invention relates to [2] a polymeric fluorescent substance having visible fluorescence in a solid state and a polystyrene-reduced number-average molecular weight of $10^3$ to $10^7$, which contains at least one repeating unit represented by formula (1 as defined above) and at least another repeating unit represented by the following formula (3), wherein the sum of the repeating unit represented by the formula (1) is from 5 to 95 mol % of the total number of the repeating units, the sum of the repeating unit represented by the formula (1) and the repeating unit represented by the formula (3) is from 50 to 100 mol % of the total number of the repeating units, and a molar ratio of the sum of the repeating unit represented by the formula (1) to the sum of the repeating unit represented by the formula (3) is from 20:1 to 1:20.

$$—Ar_3—CR_3=CR_4— \quad (3)$$

wherein $Ar_3$ represents an arylene group having 4 to 20 carbon atoms taking part in conjugated bonds or a heterocyclic compound group having 4 to 20 carbon atoms taking part in conjugated bonds; and $R_3$ and $R_4$ independently represent a group selected from the group consisting of hydrogen, an alkyl group having 1 to 20 carbon atoms, an aryl group having 6 to 20 carbon atoms, a heterocyclic compound group having 4 to 20 carbon atoms and a cyano group.

Furthermore, the present invention relates to [3] an organic electroluminescence device comprising a pair of an anode and a cathode, of which at least one electrode is transparent or semitransparent, and at least one light emitting layer formed between the electrodes, wherein said light emitting layer comprises the polymeric fluorescent substance of the term [1] or [2].

DETAILED DESCRIPTION OF THE INVENTION

The polymeric fluorescent substance of the present invention is characterized by a polymeric fluorescent substance having visible fluorescence in a solid state and a polystyrene-reduced number-average molecular weight of $10^3$ to $10^7$, which contains at least one repeating unit represented by the following formula (1), wherein the sum of the repeating unit is from 10 to 100 mol % of the total number of the repeating units.

In the polymeric fluorescent substance of the present invention, the sum of the repeating unit varies depending on the structure of the repeating unit but is from 30 to 100 mol % of the total number of the repeating units, more preferably.

$Ar_1$ in the formula (1) may be an arylene group having 4 to 20 carbon atoms taking part in conjugated bonds and containing at least one substituent represented by the above formula (2) as a nuclear substituent or a heterocyclic compound group having 4 to 20 carbon atoms taking part in the conjugated bonds and containing at least one substituent represented by the above formula (2) as a nuclear substituent.

Specific examples of $Ar_1$ include the following aromatic compound groups or derivative groups thereof,

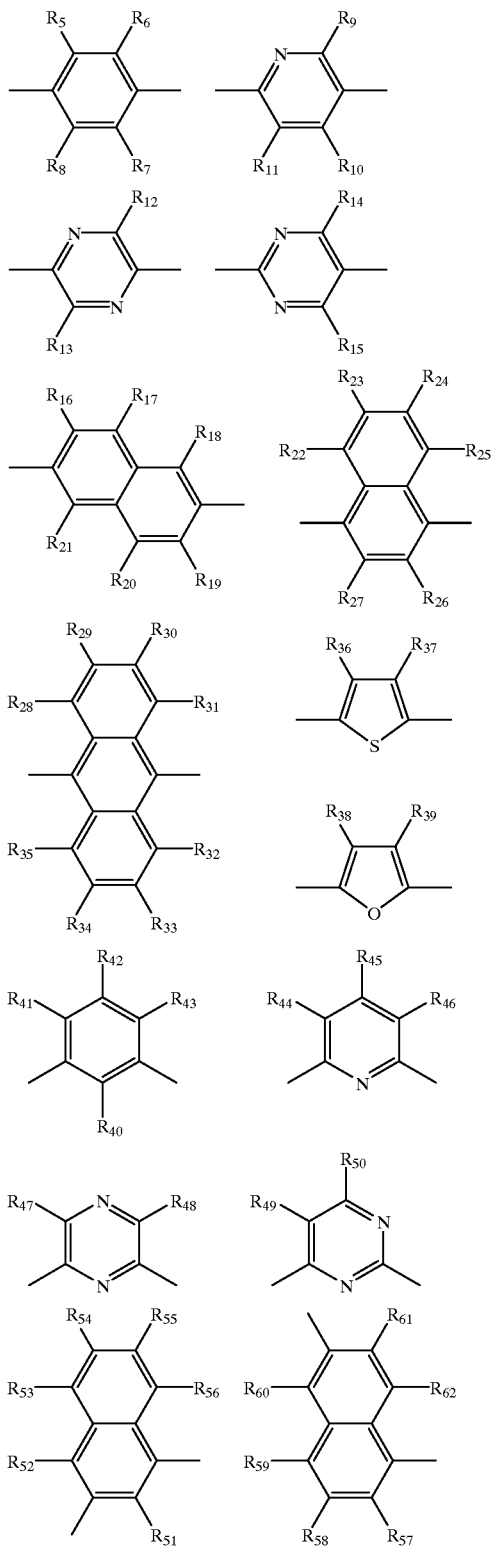

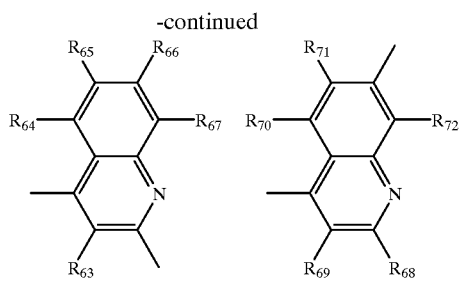

wherein $R_5$ to $R_{72}$ independently represent a group selected from the group consisting of hydrogen, cyano group, alkyl, alkoxy and alkylthio groups having 1 to 20 carbon atoms; aryl and aryloxy groups having 6 to 18 carbon atoms; and heterocyclic compound group having 4 to 14 carbon atoms, provided that at least one substituent of one $Ar_1$ example is a substituent represented by the formula (2).

Among them, nuclear substituted derivatives of 1,4-phenylene group, 2,6-naphthalenylene group, 9,10-anthrylene group, 2,5-pyridinediyl group, 2,5-thienylene group, 1,3-phenylene group, 1,3-naphthalenylene group, 2,6-pyridinediyl group and 2,4-quinolinediyl group are preferred. More preferred one include derivatives of 1,4-phenylene group, 2,5-pyridinediyl group, 2,5-thienylene group, 1,3-phenylene group, 2,6-pyridinediyl group and 2,4-quinolinediyl group. It is possible to select one or more groups from them.

In addition, $R_1$ and $R_2$ connected with a vinylene group in the repeating unit of the formula (1) independently represent a group selected from the group consisting of hydrogen, alkyl group having 1 to 20 carbon atoms, aryl group having 6 to 20 carbon atoms, heterocyclic compound group having 4 to 20 carbon atoms and cyano group.

Specific examples of the alkyl group having 1 to 20 carbon atoms include methyl group, ethyl group, propyl group, butyl group, pentyl group, hexyl group, heptyl group, octyl group, decyl group, dodecyl group and the like. Among them, methyl group, ethyl group, pentyl group, hexyl group, heptyl group and octyl group are preferred.

Examples of the aryl group include phenyl group, 4-alkoxyphenyl group (wherein the alkoxy substituent has 1 to 14 carbon atoms), 4-alkylphenyl group (wherein the alkyl substituent has 1 to 14 carbon atoms), 1-naphthyl group, 2-naphthyl group and the like. Examples of the heterocyclic compound group include 2-pyridyl group, 2-quinolyl group and the like.

The substituent represented by the formula (2) will be explained hereinafter.

$Ar_2$ represents a group selected from the group consisting of an aryl group having 4 to 20 carbon atoms taking part in conjugated bonds, a heterocyclic group having 4 to 20 carbon atoms taking part in the conjugated bonds and an aliphatic cyclic hydrocarbon compound group having 6 to 20 carbon atoms constituting the ring.

Specific examples of $Ar_2$ include the following aromatic group compound groups or derivative groups thereof and aliphatic cyclic hydrocarbon compound groups,

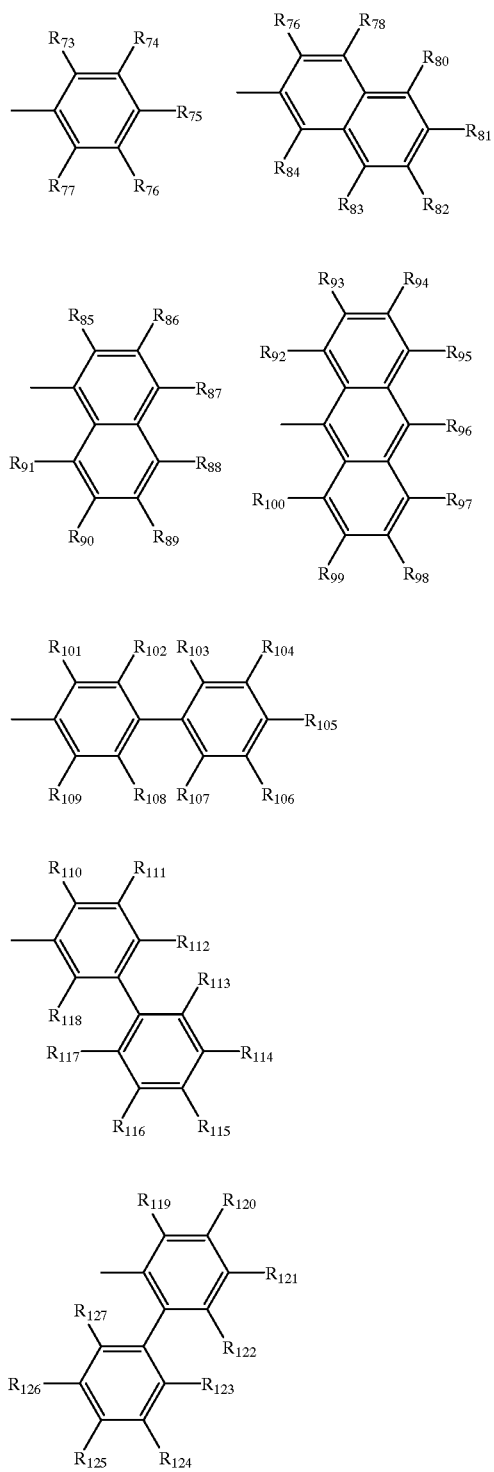

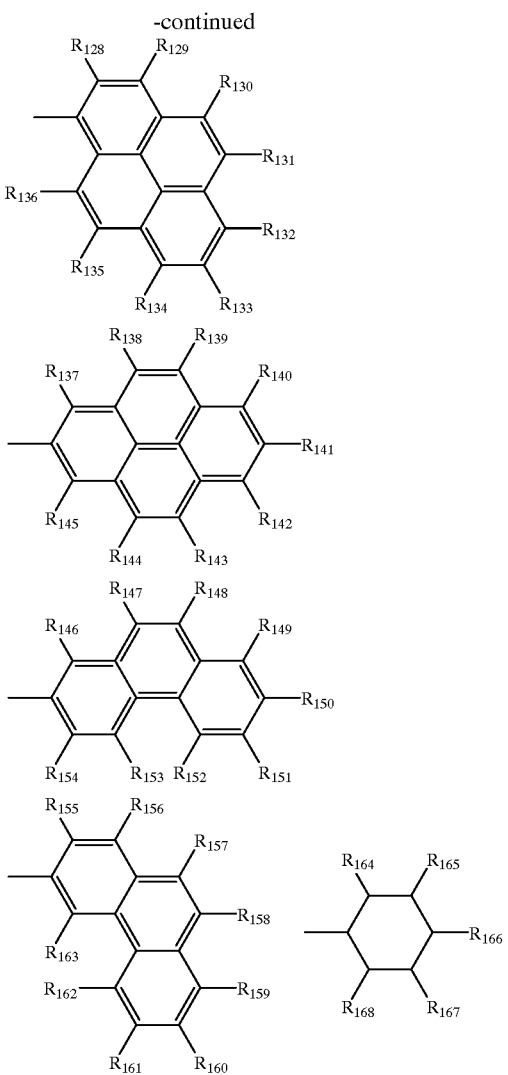

wherein $R_{73}$ to $R_{168}$ independently represent a group selected from the group consisting of hydrogen, cyano group, alkyl, alkoxy and alkylthio groups having 1 to 20 carbon atoms; aryl and aryloxy groups having 6 to 18 carbon atoms; and heterocyclic compound group having 4 to 14 carbon atoms.

Among them, phenyl group, 1-naphthyl group, 2-naphthyl group, 9-anthryl group, 4-biphenyl group, 1-pyrenyl group, cyclohexyl group or nuclear substituted derivatives thereof are preferred. More p referred one include phenyl group, 9-anthryl group, 4-biphenyl group or derivatives thereof.

In case of the phenyl group, those having a nuclear substituent at the 2- and 5-positions, 2- and 3-positions, or 2-, 3-, 5- and 6-positions are preferred.

X of the formula (2) represents O or S, m represents 0 or 1, and n represents an integer of 2 to 10. M is preferably 1, because a monomer is easily synthesized in comparison with the case where m is 0.

In order to impart an excellent solubility, fluorescent characteristics and a heat resistance, the structure of the side chain represented by the formula (2) is important. Specifically, it is a feature of the side chain represented by the formula (2) that a bulky cyclic group is present at the end of 2 to 10 methylene groups.

In addition, the polymeric fluorescent substance of the present invention is characterized by a polymeric fluorescent substance having visible fluorescence in a solid state and a polystyrene-reduced number-average molecular weight of $10^3$ to $10^7$, which contains at least one repeating unit represented by the formula (1) and at least another repeating unit represented by the formula (3), wherein the sum of the repeating unit represented by the formula (1) is from 5 to 95 mol % of the total number of the repeating units, the sum of the repeating unit represented by the formula (1) and the repeating unit represented by the formula (3) is from 50 to 100 mol % of the total number of the repeating units, and a molar ratio of the sum of the repeating unit represented by the formula (1) to the sum of the repeating unit by the formula (3) is from 20:1 to 1:19.

The sum of the repeating unit represented by the formula (1) varies depending on the structure of the repeating unit but is preferably from 30 to 95 mol % of the total number of the repeating units. The sum of the repeating unit represented by the formula (1) and the repeating unit represented by the formula (3) varies depending on the structure of the repeating units but is preferably from 70 to 100 mol % of the total number of the repeating units. Furthermore, a molar ratio of the sum of the repeating unit represented by the formula (1) to the sum of the repeating unit represented by the formula (3) is preferably from 9:1 to 1:9, more preferably from 9:1 to 1:4.

$Ar_3$ of the formula (3) represents an arylene group having 4 to 20 carbon atoms taking part in conjugated bonds or a heterocyclic compound group having 4 to 20 carbon atoms taking part in the conjugated bonds.

Specific examples of $Ar_3$ include the following aromatic compound groups or derivative groups thereof,

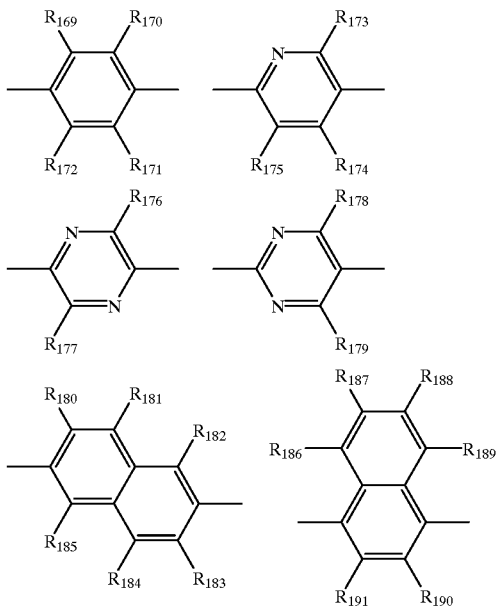

-continued

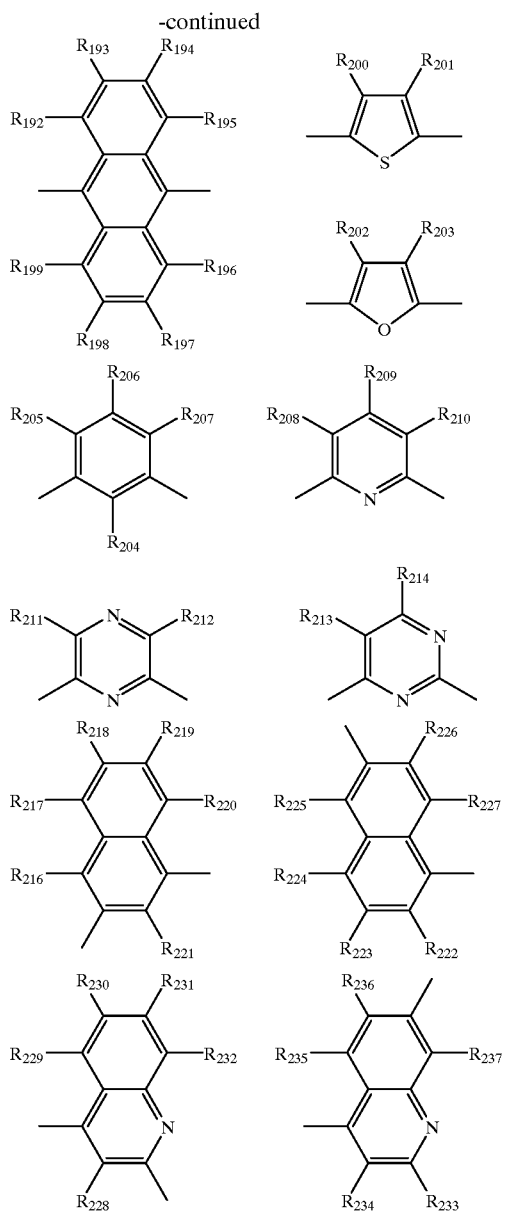

wherein $R_{169}$ to $R_{237}$ independently represent a group selected from the group consisting of hydrogen, cyano group, alkyl, alkoxy and alkylthio groups having 1 to 20 carbon atoms; aryl and aryloxy groups having 6 to 18 carbon atoms; and heterocyclic compound group having 4 to 14 carbon atoms.

Among them, 1,4-phenylene group, 2,6-naphthalenylene group, 9,10-anthrylene group, 2,5-pyridinediyl group, 2,5-thienylene group and nuclear substituted derivatives thereof; and 1,3-phenylene group, 1,3-naphthalenylene group, 2,6-pyridinediyl group, 2,4-quinolinediyl group or derivatives thereof are preferred. More preferred one include 1,4-phenylene group, 2,5-pyridinediyl group, 2,5-thienylene group, 1,3-phenylene group, 2,6-pyridinediyl group, 2,4-quinolinediyl group or derivatives thereof. It is possible to select one or more group of them.

$R_1$ and $R_2$ connected with a vinylene group in the repeating unit of the formula (1), and $R_3$ and $R_4$ connected with a vinylene group in the repeating unit of the formula (3) independently represent a group selected from the group consisting of hydrogen, an alkyl group having 1 to 20 carbon atoms, an aryl group having 6 to 20 carbon atoms, a heterocyclic compound group having 4 to 20 carbon atoms and a cyano group.

Specific examples of the alkyl group having 1 to 20 carbon atoms include methyl group, ethyl group, propyl group, butyl group, pentyl group, hexyl group, heptyl group, octyl group, decyl group, dodecyl group and the like. Among them, methyl group, ethyl group, pentyl group, hexyl group, heptyl group and octyl group are preferred.

Examples of the aryl group include phenyl group, 4-alkoxyphenyl group (wherein the alkoxy substituent has 1 to 14 carbon atoms), 4- alkylphenyl group (wherein the alkyl substituent has 1 to 14 carbon atoms), 1-naphthyl group, 2-naphthyl group and the like. Examples of the heterocyclic compound group include 2-pyridyl group, 2-quinolyl group and the like.

An terminal group of the polymeric fluorescent substance used in the present invention is not specifically limited, but when a polymerizable group is remained as it is, the light emitting characteristics and the lifetime of the resulting device may be deteriorated. Therefore, it is preferred to be protected with a stable group. Those having a conjugated bond connected with a conjugated structure of a main chain are preferred, and examples thereof include structure connected with an aryl group or a heterocyclic compound group through a vinylene group.

Specific examples of the terminal group include the following aromatic compound groups or derivative groups thereof, and groups wherein they are connected with a vinylene group,

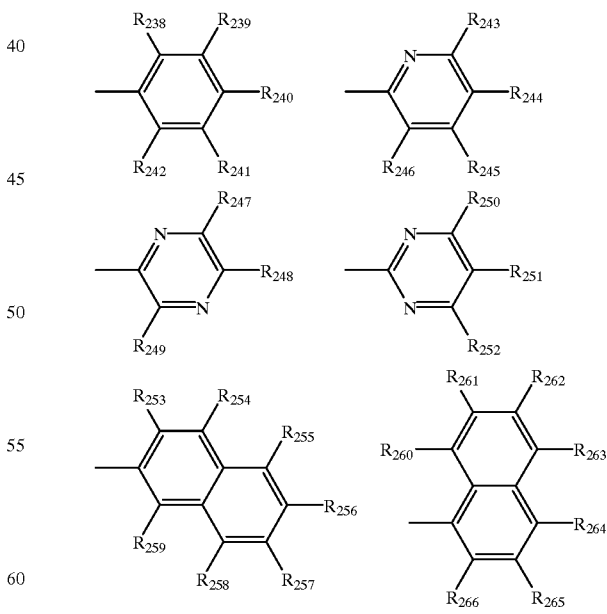

-continued

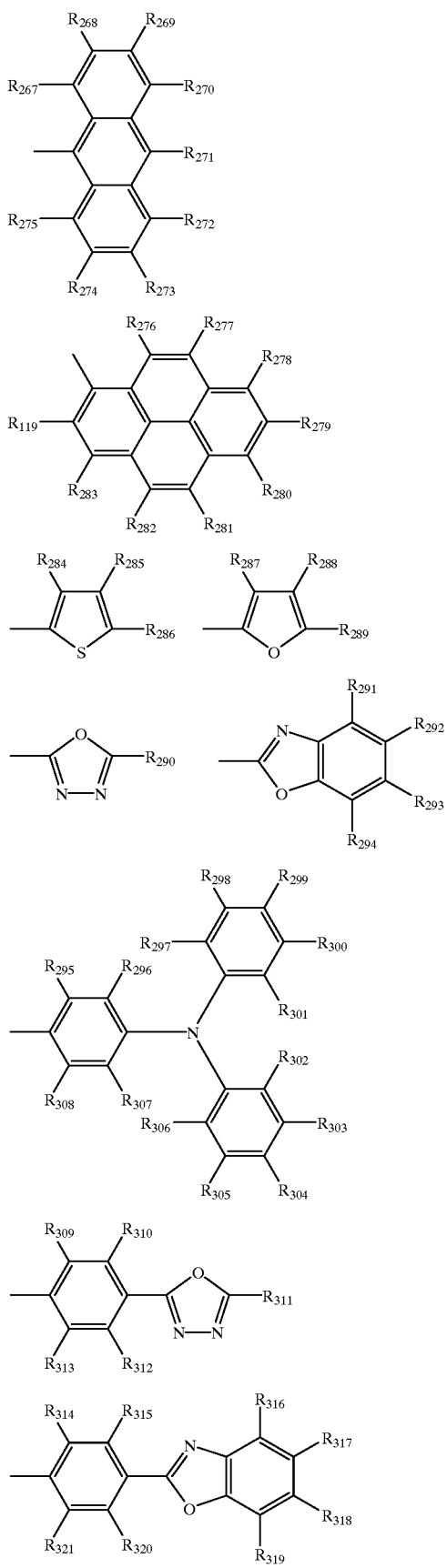

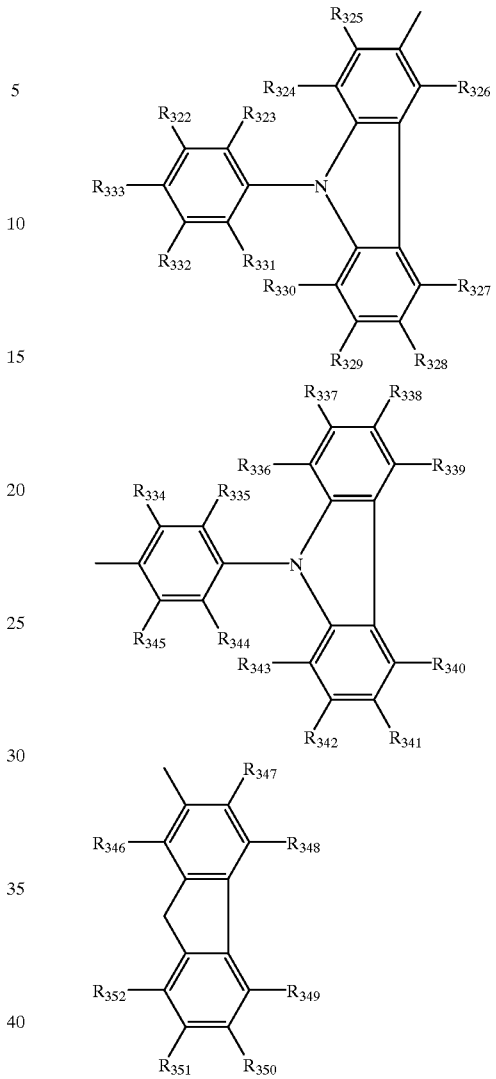

wherein $R_{238}$ to $R_{352}$ independently represent a group selected from the group consisting of hydrogen, cyano group, alkyl, alkoxy and alkylthio groups having 1 to 20 carbon atoms; aryl and aryloxy groups having 6 to 18 carbon atoms; and heterocyclic compound group having 4 to 14 carbon atoms.

Among them, phenyl group, 1-naphthyl group, 9-anthryl group, 2-pyridyl group, 2-thienyl group, oxadiazolyl group, benzoxazolyl group, 4-(N,N-diphenylamino)phenyl group, 1-pyrenyl group, 2-fluorenyl group, 2-quinolyl group, 4-(9-carbazoyl)phenyl group, 9-phenyl-3-carbazolyl group or derivatives thereof are preferred.

More preferred one include 1-naphthyl group, 9-anthryl group, oxadiazolyl group, 4-(N,N-diphenylamino)phenyl group, 1-pyrenyl group, 2-fluorenyl group, 2-quinolyl group, 4-(9-carbazoyl)phenyl group, 9-phenyl-3-carbazolyl group or derivatives thereof. Particularly preferred one include 1-naphthyl group, 9-anthryl group, 1-pyrenyl group and 2-fluorenyl group.

The polymerization degree of the polymeric fluorescent substance of the present invention is not specifically limited if the polystyrene-reduced molecular weight is from $10^3$ to $10^7$, and also varies depending on the repeating unit and proportion thereof. In view of the film forming property, the sum of the repeating unit is preferably from 4 to 10000, more preferably from 5 to 3000, particularly from 10 to 2000. The term "molecular weight" used herein means a polystyrene-reduced number-average molecular weight determined by gel permeation chromatography (GPC)using chloroform as a solvent.

The polymeric fluorescent substance of the present invention may be a polymer or copolymer which is only composed of the repeating unit represented by the formula (1), a copolymer of the repeating units represented by the formulas (1) and (3), or a copolymer wherein the sum of the repeating units represented by the formulas (1) and (3) is not less than 50 mol % of the total number of the repeating units. In case of the copolymer, it may be a random, block or graft copolymer, and may also be a polymer having an intermediate structure of them, for example, a partially block type random copolymer. In view of obtaining a copolymer having high quantum yield of fluorescence, a partially block type random copolymer and a block or graft copolymer is preferable to a completely random copolymer. Those wherein the main chain in a molecule is branched to have three or more terminals are also included.

A film can be formed from a solution of the polymeric fluorescent substance of the present invention.

Examples of a good solvent for the polymeric fluorescent substance include chloroform, methylene chloride, dichloroethane, tetrahydrofuran, toluene, xylene, mesitylene, decahydronaphthalene, n-butylbenzene and the like. The polymeric fluorescent substance can be dissolved in a solvent in an amount of not less than 0.1% by weight, but the amount varies depending on the structure and molecular weight of the polymeric fluorescent substance.

In view of a heat resistance, the number of the substituent represented by the formula (2) is preferably not less than 10%, more preferably not less than 20%, of the total number of the substituents.

When a film is formed from a solution of these organic solvent-soluble polymeric fluorescent substance in case of producing the organic EL device, the solvent may only be removed by drying after applying this solution. When mixing an charge transporting material described hereinafter, the same technique can be applied and it is remarkably advantageous in the production.

According to the method for production of the polymeric fluorescent substance of the present invention, a polymer containing the repeating unit represented by the formula (1) or (3) is synthesized by the carbon-carbon double bond formation reaction. When the terminal group is converted into a specific stable group, the resulting polymer may be further reacted with a monomer which forms an terminal group. Examples of the reaction which forms a carbon-carbon double bond used in the present invention include the Wittig reaction, the dehydrohalogenation reaction, the sulfonium salt decomposition method, the Knoevenagel reaction and the like.

In the wittig reaction, for example, a dialdehyde compound represented by the formula (4) is reacted with a diphosphonium salt compound represented by the formula (5). $Ar_5$ and $Ar_6$ may be the same or different groups. When $Ar_5$ and $Ar_6$ are different, an alternating copolymer can be obtained. Furthermore, when using two or more dialdehyde compounds and/or two or more diphosphonium salt compounds, a copolymer of them can be obtained.

$$OHC-Ar_5-CHO \qquad (4)$$

$$\begin{matrix} X_1^- & & X_1^- \\ (C_6H_5)_3P^+CH_2-Ar_6-CH_2P^+(C_6H_5)_3 \end{matrix} \qquad (5)$$

$Ar_5$ and $Ar_6$ are independently selected from a group consisting of $AR_1$ in the formula (1) or $Ar_3$ in the formula (3) provided that they must be selected so that a group represented by $Ar_1$ of the formula (1) is contained in a predetermined amount after polymerization; and $X_1^-$ represents a counter ion and examples thereof include halide ion and the like.

In the dehydrohalogenation method, an aromatic compound wherein halogenated methyl groups are connected with both sides is polycondensated.

$$X_2R_{353}HC-Ar_7-CHR_{354}X_2 \qquad (6)$$

[$Ar_7$ represents a group having the same definition as that of a group represented by $Ar_1$ in the formula (1) or $Ar_3$ in the formula (3) provided that they must be selected so that a group represented by $Ar_1$ of the formula (1) is contained in a predetermined amount after polymerization; $X_2$ represents a halogen atom; $R_{353}$ and $R_{354}$ independently represent a group selected from the group consisting of hydrogen, cyano group, alkyl group having 1 to 20 carbon atoms, aryl group having 6 to 18 carbon atoms and heterocyclic compound group having 4 to 14 carbon atoms].

In the sulfonium salt decomposition method, an aromatic compound wherein sulfonium salt groups are attached to both sides is polycondensated.

$$X_3^-R_{355}R_{365}S^{+R}{}_{357}HC-Ar_8-CHR_{358}S^{+R}{}_{359}R-X_3^- \qquad (7)$$

[$Ar_8$ represents a group having the same definition as that of a group represented by $Ar_1$ in the formula (1) or $Ar_3$ in the formula (3) provided that they must be selected so that a group represented by $AR_1$ of the formula (1) is contained in a predetermined amount after polymerization; $X_3$ represents a halogen atom; $R_{357}$ and $R_{358}$ independently represent a group selected from the group consisting of hydrogen, cyano group, alkyl, alkoxy and alkylthio groups having 1 to 20 carbon atoms; aryl and aryloxy groups having 6 to 18 carbon atoms and heterocyclic compound group having 4 to 14 carbon atoms; and $R_{355}$ and $R_{356}$, and $R_{359}$ and $R_{360}$ independently represent an alkyl group having 1 to 10 carbon atoms, or a cycloalkyl group having 4 or more carbon atoms which has a ring structure formed between $R_{355}$ and $R_{356}$, and/or between $R_{359}$ and $R_{360}$]

In the Knoevenagel reaction, a copolymer can be obtained by using the same method as that described in J. Org. Chem. Vol. 25, page 813 (1959), Makromol. Chem. Vol. 74, page 71 (1964) and the like].

That is, a dialdehyde compound represented by the formula (8) is polycondensated with a compound represented by the formula (9).

$$OHC-Ar_9-CHO \qquad (8)$$

$$R_{361}H_2C-Ar_{10}-CH_2R_{362} \qquad (9)$$

[$Ar_9$ and $Ar_{10}$ independently represent a group having the same definition as that of a group represented by $AR_1$ in the formula (1) or $Ar_3$ in the formula (3) provided that they must be selected so that a group represented by $Ar_1$ of the formula (1) is contained in a predetermined amount after polymerization; and $R_{361}$ and $R_{362}$ independently represent a group selected from the group consisting of hydrogen, cyano group, alkyl, alkoxy and alkylthio groups having 1 to 20 carbon atoms; aryl and aryloxy groups having 6 to 18 carbon atoms and heterocyclic compound group having 4 to 14 carbon atoms].

Specific examples thereof include method of polymerizing the corresponding diacetonitrile compound (e.g. m-phenylenediacetonitrile) with the corresponding dialdehyde compound (e.g. 2,5-dioctyloxyterephthalaldehyde) in an ethyl alcohol/chloroform mixed solution using sodium methoxide. When two or more diacetonitriles and/or two or more dialdehyde compounds are reacted, a copolymer of them can be obtained. Furthermore, since both the Wittig reaction and the Knoevenagel reaction can be conducted by using lithium ethoxide, when the dialdehyde compound, diphosphonium salt compound and diacetonitrile compound are reacted by mixing them in a corresponding amount, a copolymer of them can be obtained.

The terminal group of the resulting polymer may be further reacted with a monofunctional compound to form a stable terminal group. This monofunctional compound is appropriately selected according to the reaction used. When two monomers having a different functional group are polycondensated, the monofunctional compound is appropriately selected according to the amount of the monomer. That is, since the terminal group is a phosphonium salt or aldehyde in the Wittig reaction, aldehyde and a phosphonium salt are selected as the monofunctional compound, respectively. Since the terminal group is a halogenated methyl group in the dehydrohalogenation method, a sulfonium salt group in the sulfonium salt decomposition method, and an aldehyde group or an active methylene group in the Knoevenagel reaction, a compound having a group which reacts with each polymerization terminal group is reacted to form a stable terminal group.

Among them, a method according to the Wittig reaction and the Knoevenagel reaction is preferred in view of the control and yield of the reaction.

A method for synthesis of an arylene vinylene copolymer as one embodiment of the polymeric fluorescent substance of the present invention will be explained in more detail.

An arylene vinylene copolymer is obtained by the Wittig reaction, and there is exemplified an embodiment that a bis(halogenated methyl) compound (e.g. 2,5-dioctylocy-p-xylylene dichloride) is reacted first with triphenylphosphine in a N,N-dimethylformamide solvent to synthesize a phosphonium salt, which is condensed with a dialdehyde compound containing a structure of the formula (1) (e.g. terephthalaldehyde) in ethyl alcohol using lithium ethoxide according to the Wittig reaction to obtain an arylene vinylene copolymer. When two or more diphosphonium salts and/or two or more dialdehyde compounds are reacted, a copolymer of them can be obtained.

Furthermore, there is exemplified an embodiment that a halogenated methyl compound (e.g. 9-chloromethylnaphthalene) is reacted with triphenylphosphine in a N,N-dimethylformamide solvent to synthesize a phosphonium salt, which is condensed using lithium ethoxide in ethyl alcohol according to the Wittig reaction in the same manner as that in case of the previously obtained arylene vinylene copolymer having aldehyde as terminal group to obtain a copolymer whose terminal group is substituted.

When using these polymers as a light emitting material of the organic EL device, it is preferred to subject them to a purification treatment such as reprecipitation, fractionation by chromatography, etc. after synthesis, because the purity influences light emitting characteristics.

The structure of the organic EL device produced by using the polymeric fluorescent substance of the present invention may be any one which uses a light emitting material of the polymeric fluorescent substance of the present invention in a light emitting layer to be provided between a pair of electrodes of which at least one electrode is transparent or semitransparent. Therefore, a known structure is used, and it is not specifically limited.

Examples thereof include a structure comprising a light emitting layer of the polymeric fluorescent substance or a light emitting layer composed of a mixture of the polymeric fluorescent substance and a charge transporting material (which means a general term of an electron transporting material and a hole transporting material) and a pair of electrodes provided on both surfaces of said light emitting layer, and a structure comprising an electron transporting layer containing an electron transporting material between a cathode and a light emitting layer and/or a hole transporting layer containing a hole transporting material between an anode and a light emitting layer.

The case where the light emitting layer or charge transporting layer is used alone and the cases where a plurality of them are used in combination are also included in the present invention. Furthermore, there may be used a light emitting material other than the polymeric fluorescent substance described hereinafter for the light emitting layer. It is also possible to form a layer wherein a polymeric fluorescent substance and/or a charge transporting material are dispersed in a polymeric compound.

As a charge transporting material used together with the polymeric fluorescent substance of the present invention, that is, an electron transporting material or a hole transporting material, known materials can be used and are not specifically limited. Examples of the hole transporting material include pyrazoline derivative, arylamine derivative, stilbene derivative, tripheyldiamine derivative and the like. Examples of the electron transporting material include oxadiazole derivative, anthraquinodimethane or its derivative, benzoquinone or its derivative, naphthoquinone or its derivative, anthraquinone or its derivative, tetracyanoanthraquinodimethane or its derivative, fluorenone derivative, diphenyldicyanoethylene or its derivative, diphenoquinone or its derivative, metal complex of 8-hydroxyguinoline or its derivative and the like.

Specific examples thereof include those described in Japanese Patent Kokai (Laid-Open) Nos. 63-70257, 63-175860, 2-135359, 2-135361, 2-209988, 3-37992 and 3-152184. As the hole transporting material, triphenyldiamine derivative is preferred. As the electron transporting material, oxadiazole derivative, benzoquinone or its derivative, anthraquinone or its derivative, or metal complex of 8-hydroxyquinoline or its derivative are preferred. As the hole transporting material, 4,4'-bis(N-(3-methylphenyl)-N-phenylamino)biphenyl is particularly preferred. As the electron transporting material, 2-(4-biphenylyl)-5-(4-t-butylphenyl)-1,3-4-oxadiazole, benzoquinone, anthraquinone and 8-hydroxyquinoline,aluminum salt are particularly preferred.

Among them, any one of the compound of the electron transporting material and the compound of the hole transporting material may be used, or both of them may be used simultaneously. These may be used alone or in combination thereof.

When a charge transporting layer (which means a general term of an electron transporting material and a hole transporting material) is provided between the light emitting layer and the electrode, the charge transporting layer may be formed using these charge transporting materials.

When a charge transporting material is used by mixing in the light emitting layer, since an amount of the charge transporting material used varies depending on the kind of the compound to be used, the amount may be appropriately decided taking the kind of the compound into consideration within the range where sufficient film forming property and light emitting characteristics are not deteriorated. The amount is preferably from 1 to 40% by weight, more preferably from 2 to 30% by weight, based on the amount of the light emitting material.

The known light emitting material which can be used together with the polymeric fluorescent substance of the present invention is not specifically limited. For example, there can be used naphthalene derivative, anthracene or its derivative, perylene or its derivative, polymethine, xanthene, coumarin and cyanine pigments, metal complex of 8-hydroxyquinoline or its derivative, aromatic amine, tetraphenylcyclopentadiene or its derivative, tetraphenylbutadiene or its derivative and the like. Specifically, known light emitting materials described in Japanese Patent Kokai (Laid-Open) Nos. 57-51781 and 59-194393 can be used.

A typical method for producing the organic EL device using the polymeric fluorescent substance of the present invention will be described hereinafter. As a pair of electrodes composed of an anode and a cathode, for example, those obtained by forming a transparent or semitransparent electrode on a transparent substrate such as glass, transparent plastic, etc. can be used.

As the material of the anode, for example, there can be used conductive metal oxide films, semitransparent metal thin films and the like. Specifically, indium-tin oxide (ITO), films made by using conductive glass such as tin oxide, etc. (e.g. NESA, etc.), Au, Pt, Ag and Cu are used. Examples of the producing method include vacuum deposition method, sputtering method, plating method and the like.

Then, a light emitting layer containing the above polymer or the polymer and the charge transporting material is formed on this anode. Examples of the forming method include spin coating method, casting method, dipping method, bar coating method, roll coating method, gravure coating method, flexography method or spray coating method using a melt, solution or mixed solution of these materials. It is particularly preferred to form a film from the solution or mixed solution using an application method such as spin coating method, casting method, dipping method, bar coating method, roll coating method, gravure coating method, flexography method, spray coating method and the like.

A film thickness of the light emitting layer is preferably within the range from 1 nm to 1 μm, more preferably from 2 to 500 nm. In order to enhance the light emitting efficiency by increasing the current density, the film thickness is preferably within the range from 5 to 200 nm.

When a thin film is formed by the application method, it is preferred to dry at the temperature within the range from 30 to 300° C., preferably from 60 to 200° C., under reduced pressure or an inert atmosphere so as to remove the solvent.

When the light emitting layer and the electron transporting layer are laminated, it is preferred to form the hole transporting layer on the anode before providing the light emitting layer according to the above film forming method and/or to form the electron transporting layer after forming the light emitting layer.

The method of forming a film of the charge transporting layer is not specifically limited, and there can be used vacuum deposition method in the powder state; application method such as spin coating method, casting method, dipping method, bar coating method, roll coating method, gravure coating method, flexography method, spray coating method, and the like after dissolving in the solution; or application method such as spin coating method, casting method, dipping method, bar coating method, roll coating method, gravure coating method, flexography method, spray coating method, and the like after mixing the polymer compound with the charge transporting material in the solution or molten state, followed by dispersing.

The polymeric compound to be mixed is not specifically limited, but those which do not drastically inhibit charge transport are preferred. Those whose absorption of visible light is not strong are preferably used.

The charge transporting polymeric compound can be used in the charge transporting layer without mixing with a low-molecular-weight charge transporting material.

Examples of the polymeric compound include poly(N-vinylcarbazole), polyaniline or its derivative, polythiophene or its derivative, poly(p-phenylene vinylene) or its derivative, poly(2,5-thienylene vinylene) or its derivative, polycarbonate, polyacrylate, polymethyl acrylate, polymethyl methacrylate, polystyrene, polyvinyl chloride, polysiloxane and the like. It is preferred to use the application method because a film can be easily formed.

A film thickness of the charge transporting layer must be a thickness so that no pin hole is formed. When the film thickness is too large, the resistance of the device increases to require a high driving voltage and, it is not preferred. Accordingly, the film thickness of the charge transporting layer is preferably within the range from 1 nm to 1 μm, more preferably from 2 to 500 nm, particularly from 5 to 200 nm.

Then, an electrode is formed on the light emitting layer or electron transporting layer. This electrode serves as an electron injection cathode. The material is not specifically limited, but a material having small ionization energy is preferred. For example, there can be used Al, In, Mg, Ca, Li, Mg—Ag alloy, In—Ag alloy, Mg—In alloy, Mg—Al alloy, Mg—Li alloy, Al—Li alloy, Al—Ca alloy, graphite thin film and the like. As the method of producing the cathode, there can be used a vacuum deposition method, a sputtering method and the like.

PREFERRED EMBODIMENTS OF THE INVENTION

The following Examples further illustrate the present invention in detail but are not to be construed to limit the scope thereof.

In the following Examples, a polystyrene-reduced number-average molecular weight was measured by gel permeation chromatography (GPC) using chloroform as a solvent.

EXAMPLE 1

Synthesis of Polymeric Fluorescent Substance 1

2,5-diphenylpropyloxy-p-xylylene dibromide was reacted with triphenylphosphine in a N,N-dimethylformamide solvent to synthesize a phosphonium salt. 10.56 Parts by weight of the resulting phosphonium salt and 1.21 parts by weight of terephthalaldehyde were dissolved in an ethanol-chloroform mixed solvent. After an ethyl alcohol solution containing 1.1 parts by weight of lithium ethoxide was added dropwise to an ethanol-chloroform mixed solution of a phosphonium salt and dialdehyde, a chloroform solution containing 0.92 parts by weight of 1-pyrenecarbaldehyde was added to this reaction solution and an ethanol solution containing 1.1 parts by weight of lithium ethoxide was added dropwise, followed by reacting at room temperature for 3 hours.

After the reaction solution was allowed to stand at room temperature overnight, the formed precipitate was recovered. Then, this precipitate was washed with ethanol, an ethanol-water mixed solvent and then ethanol. This precipitate was dissolved in chloroform and then subjected to reprecipitation purification by adding ethyl alcohol. The precipitate was dried under reduced pressure to obtain 2.5 parts by weight of a polymer. The resulting polymer is referred to as a polymeric fluorescent substance 1.

The repeating unit of the polymeric fluorescent substance 1 is shown below. The terminal structure is mainly 1-pyrenyl group.

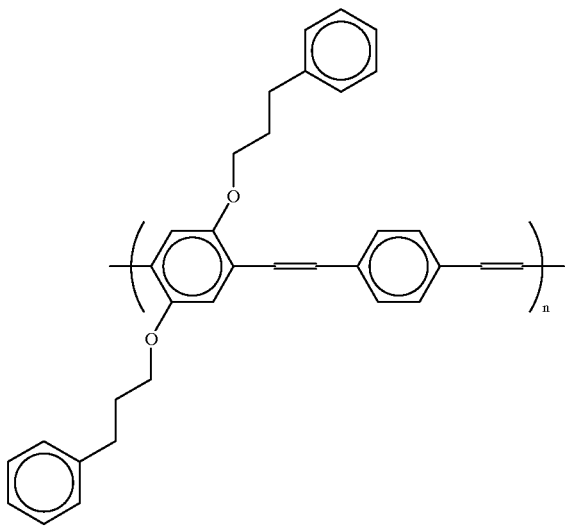

The polystyrene-reduced number-average molecular weight of the polymeric fluorescent substance 1 was 3.4× $10^3$. The structure of the polymeric fluorescent substance 1 was confirmed by $^1$H-NMR and IR spectrum.

EXAMPLE 2

Synthesis of Polymeric Fluorescent Substance 2

According to the same manner as that described in Example 1 except for using 1.89 parts by weight of 4,4'-diformylbiphenyl in place of terephthalaldehyde, polymerization, purification and drying were conducted to obtain 3.0 parts by weight of a polymer. The resulting polymer is referred to as polymeric fluorescent substance 2.

The repeating unit of the polymeric fluorescent substance 2 is shown below. The terminal structure is mainly 1-pyrenyl group.

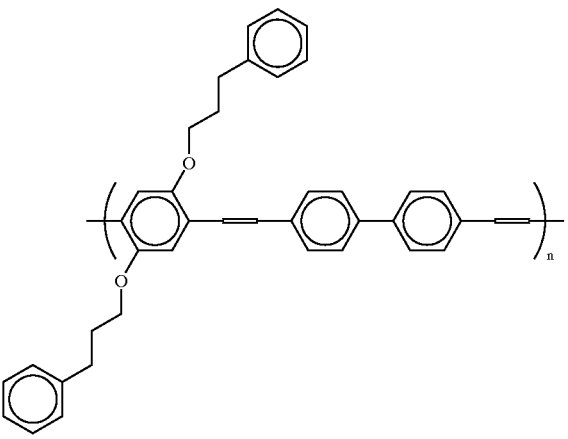

The polystyrene-reduced number-average molecular weight of the polymeric fluorescent substance 2 was 2.0× $10^3$. The structure of the polymeric fluorescent substance 2 was confirmed by $^1$H-NMR and IR spectrum.

EXAMPLE 3

Synthesis of Polymeric Fluorescent Substance 3

According to the same manner as that described in Example 1 except for using 0.6 parts by weight of terephthalaldehyde and 0.6 parts by weight of isophthalaldehyde in place of terephthalaldehyde, polymerization, purification and drying were conducted to obtain 1.6 parts by weight of a polymer. The resulting polymer is referred to as polymeric fluorescent substance 3.

Two repeating units of the polymeric fluorescent substance 3 are shown below. The polymeric fluorescent substance 3 is a random copolymer and the terminal structure thereof is mainly 1-pyrenyl group.

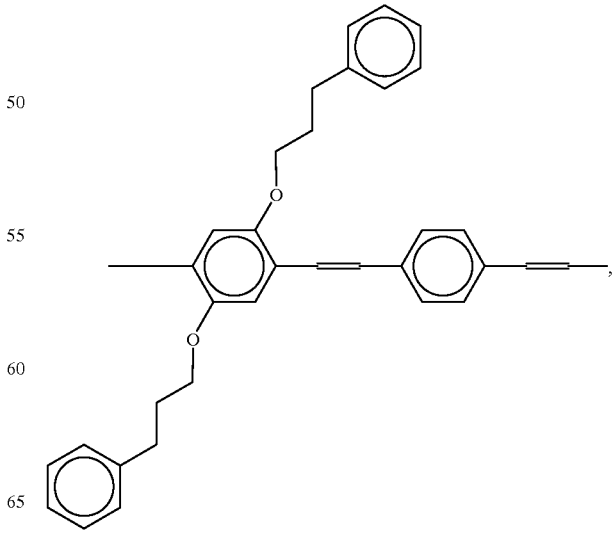

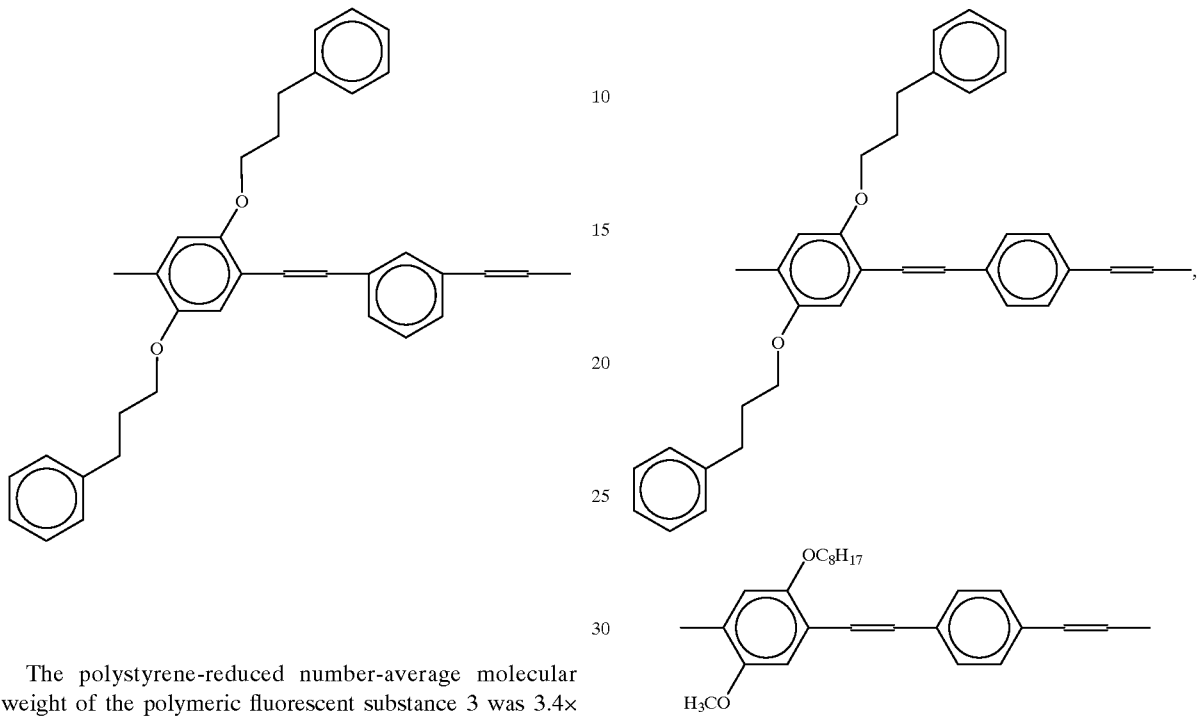

The polystyrene-reduced number-average molecular weight of the polymeric fluorescent substance 3 was 3.4×10³. The structure of the polymeric fluorescent substance 3 was confirmed by ¹H-NMR and IR spectrum.

EXAMPLE 4

Synthesis of Polymeric Fluorescent Substance 4

According to the same manner as that described in Example 1 except for using 5.28 parts by weight of a phosphonium salt of 2,5-diphenylpropyloxy-p-xylylene dibromide and 4.29 parts by weight of a phosphonium salt of 2-methoxy-5-octyloxy-p-xylylene dichloride in place of the phosphonium salt of 2,5-diphenylpropyloxy-p-xylylene dibromide, polymerization, purification and drying were conducted to obtain 0.9 parts by weight of a polymer. The resulting polymer is referred to as polymeric fluorescent substance 4.

Two repeating units of the polymeric fluorescent substance 4 are shown below. The polymeric fluorescent substance 4 is a random copolymer and the terminal structure thereof is mainly 1-pyrenyl group.

The polystyrene-reduced number-average molecular weight of the polymeric fluorescent substance 4 was 4.3×10³. The structure of the polymeric fluorescent substance 4 was confirmed by ¹H-NMR and IR spectrum.

EXAMPLE 5

Synthesis of Polymeric Fluorescent Substance 5

According to the same manner as that described in Example 1 except for using 5.28 parts by weight of a phosphonium salt of 2,5-diphenylpropyloxy-p-xylylene dibromide and 4.76 parts by weight of a phosphonium salt of 2-methoxy-5-octyloxy-p-xylylene dichloride in place of the phosphonium salt of 2,5-diphenylpropyloxy-p-xylylene dibromide, polymerization, purification and drying were conducted to obtain 1.6 parts by weight of a polymer. The resulting polymer is referred to as polymeric fluorescent substance 5.

Two repeating units of the polymeric fluorescent substance 5 are shown below. The molar ratio of these two repeating units is 1:1. The polymeric fluorescent substance 5 is a random copolymer and the terminal structure thereof is mainly 1-pyrenyl group.

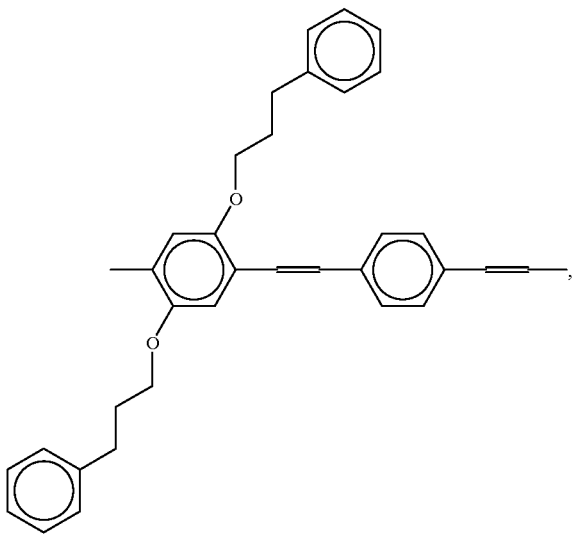

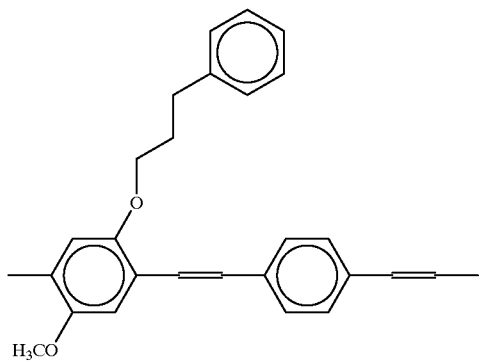

The polystyrene-reduced number-average molecular weight of the polymeric fluorescent substance 5 was 3.4× $10^3$. The structure of the polymeric fluorescent substance 5 was confirmed by $^1$H-NMR and IR spectrum.

EXAMPLE 6

Synthesis of Polymeric Fluorescent Substance 6

According to the same manner as that described in Example 1 except for using 4.78 parts by weight of a phosphonium salt of 2,5-dioctyloxy-p-xylylene dichloride and 4.76 parts by weight of a phosphonium salt of 2-methoxy-5-phenylpropyloxy-p-xylylene dibromide in place of the phosphonium salt of 2,5-diphenylpropyloxy-p-xylylene dibromide, polymerization, purification and drying were conducted to obtain 1.0 parts by weight of a polymer. The resulting polymer is referred to as polymeric fluorescent substance 6.

Two repeating units of the polymeric fluorescent substance 6 are shown below. The molar ratio of these two repeating units is 1:1. The polymeric fluorescent substance 6 is a random copolymer and the terminal structure thereof is mainly 1-pyrenyl group.

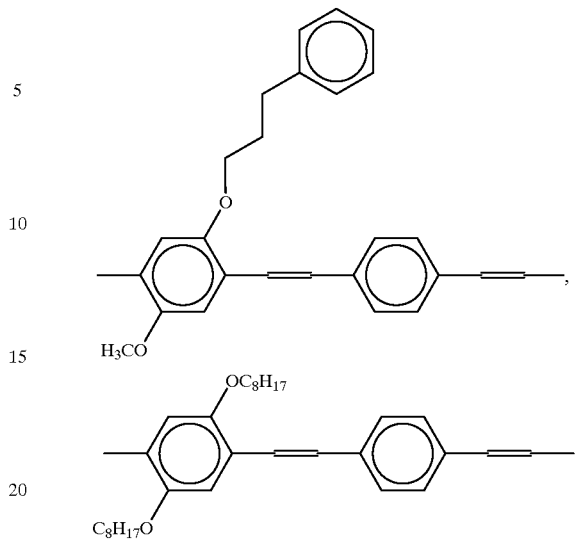

The polystyrene-reduced number-average molecular weight of the polymeric fluorescent substance 6 was 4.0× $10^3$. The structure of the polymeric fluorescent substance 6 was confirmed by $^1$H-NMR and IR spectrum.

Comparative Example 1

Synthesis of Polymeric Fluorescent Substance 7

According to the same manner as that described in Example 1 except for using 10.5 parts by weight of a phosphonium salt of 2,5-dioctyloxy-p-xylylene dichloride in place of the phosphonium salt of 2,5-diphenylpropyloxy-p-xylylene dibromide, and using 1.6 parts by weight of 1-pyrenecarbaldehyde, polymerization, purification and drying were conducted to obtain 2.0 parts by weight of a polymer. The resulting polymer is referred to as polymeric fluorescent substance 7.

The repeating unit of the polymeric fluorescent substance 7 is shown below. The terminal structure is mainly 1-pyrenyl group.

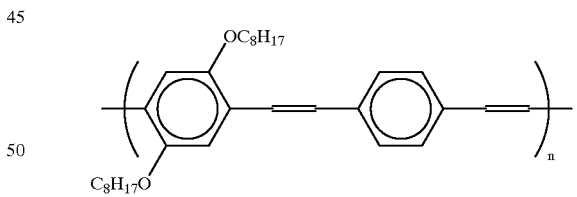

The polystyrene-reduced number-average molecular weight of the polymeric fluorescent substance 7 was 4.0× $10^3$. The structure of the polymeric fluorescent substance 7 was confirmed by $^1$H-NMR and IR spectrum.

Comparative Example 2

Synthesis of Polymeric Fluorescent Substance 8

According to the same manner as that described in Example 1 except for using 10.4 parts by weight of a phosphonium salt of 2-methoxy-5-octyloxy-p-xylylene dibromide in place of the phosphonium salt of 2,5-diphenylpropyloxy-p-xylylene dibromide, and using 1.6 parts by weight of 1-pyrenecarbaldehyde, polymerization, purification and drying were conducted to obtain 1.8 parts by weight of a polymer. The resulting polymer is referred to as polymeric fluorescent substance 8.

The repeating unit of the polymeric fluorescent substance 8 is shown below. The terminal structure is mainly 1-pyrenyl group.

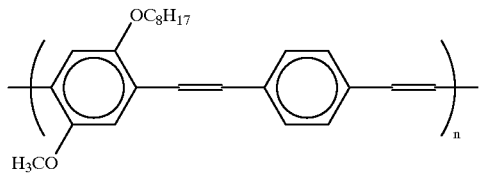

The polystyrene-reduced number-average molecular weight of the polymeric fluorescent substance 8 was $2.9 \times 10^3$. The structure of the polymeric fluorescent substance 8 was confirmed by $^1$H-NMR and IR spectrum.

EXAMPLE 7

Synthesis of Polymeric Fluorescent Substance 9

According to the same manner as that described in Example 1 except for using 5.81 parts by weight of a phosphonium salt of 2,5-diphenylpropyloxy-p-xylylene dibromide and 0.61 parts by weight of a phosphonium salt of 2-methoxy-5-octyloxy-p-xylylene dibromide as the phosphonium salt, using 0.61 parts by weight of terephthalaldehyde and 0.61 parts by weight of isophthalaldehyde as the dialdehyde compound and using 4.96 parts by weight of lithium ethoxide and 1.80 parts by weight of 1-pyrenecarbaldehyde, polymerization, purification and drying were conducted to obtain 2.5 parts by weight of a polymer. The resulting polymer is referred to as polymeric fluorescent substance 9.

Four repeating units of the polymeric fluorescent substance 9 are shown below. Four repeating units are contained in almost the same proportion. The polymeric fluorescent substance 9 is a random copolymer and the terminal structure thereof is mainly 1-pyrenyl group.

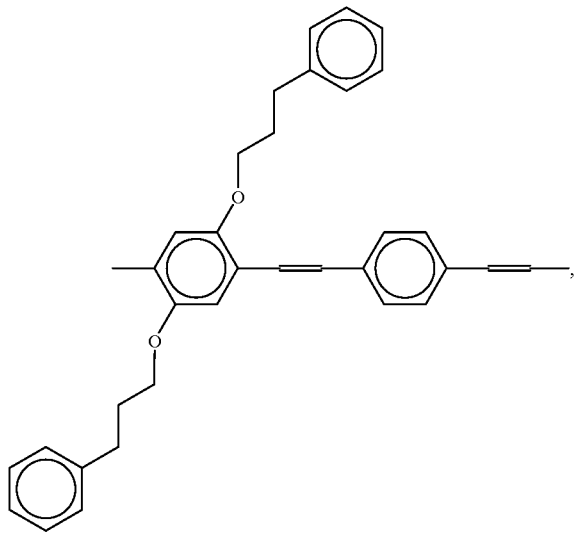

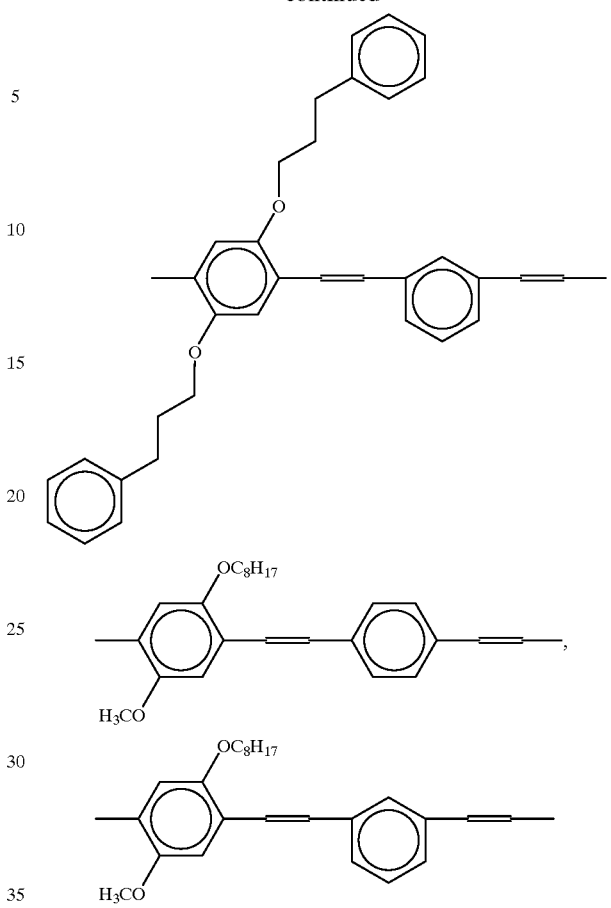

The polystyrene-reduced number-average molecular weight of the polymeric fluorescent substance 9 was $4.5 \times 10^3$. The structure of the polymeric fluorescent substance 9 was confirmed by $^1$H-NMR and IR spectrum.

EXAMPLE 8

Synthesis of Polymeric Fluorescent Substance 10

According to the same manner as that described in Example 1 except for using 5.81 parts by weight of a phosphonium salt of 2,5-diphenylpropyloxy-p-xylylene dibromide and 5.25 parts by weight of 2,5-dioctyloxy-p-xylylene dichloride in place of the phosphonium salt of 2,5-diphenylpropyloxy-p-xylylene dibromide and using 1.8 parts by weight of 1-pyrenecarbaldehyde, polymerization, purification and drying were conducted to obtain 2.5 parts by weight of a polymer. The resulting polymer is referred to as polymeric fluorescent substance 10.

Two repeating units of the polymeric fluorescent substance 10 are shown below. The molar ratio of two repeating units is 1:1. The polymeric fluorescent substance 10 is a random copolymer and the terminal structure thereof is mainly 1-pyrenyl group.

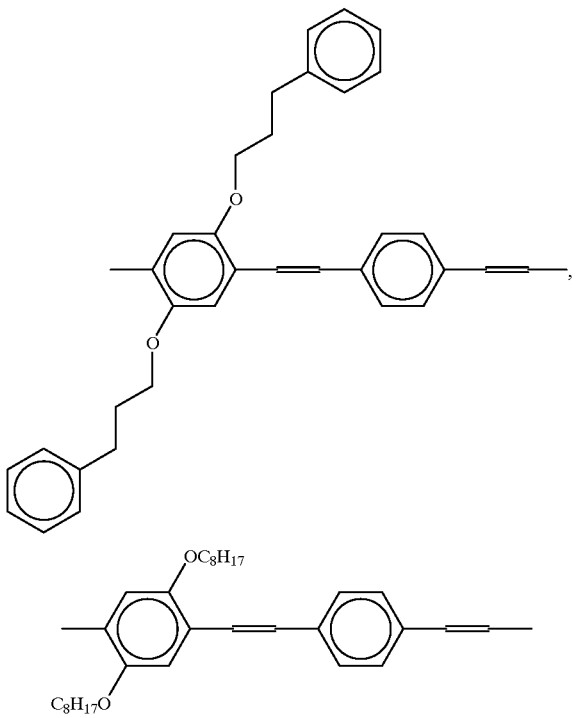

The polystyrene-reduced number-average molecular weight of the polymeric fluorescent substance 10 was 4.2× $10^3$. The structure of the polymeric fluorescent substance 10 was confirmed by $^1$H-NMR and IR spectrum.

EXAMPLE 9

Measurement of Absorption Spectrum and Fluorescence spectrum, and quantum yield of fluorescence The polymeric fluorescent substances 1 to 10 were easily dissolved in chloroform. 0.2% chloroform solutions of them were spin-coated on quartz plates to form thin films of polymers. An ultraviolet visible absorption spectrum and a fluorescence spectrum of this thin film were measured by using a spectrophotometer UV365 manufactured by Shimazu Corp. and a spectrophotometer 850 manufactured by Hitachi Seisakusho Co., Ltd., respectively. In the calculation of the relative quantum yield of fluorescence, the fluorescence spectrum in case of exciting at 410 nm was used. The intensity of fluorescence was determined as a relative value by dividing an area of the fluorescence spectrum, plotted versus wavenumber in the abscissa, by an absorbance at 410 nm. The intensities of fluorescence of the polymeric fluorescent substances 1 to 6 and 9 to 10 were stronger than that of the polymeric fluorescent substance 8, as shown in Table 1.

EXAMPLE 10

Evaluation of Heat Resistance by Differential Scanning calorimetry (DSC)

Using a differential scanning calorimeter DSC200 manufactured by Seiko Denshi Co., Ltd., the thermal analysis of the polymeric fluorescent substances 1 to 10 was conducted. In all polymeric fluorescent substances, an endothermic peak which may corresponds to softening of the polymer was recognized. The temperature thereof is shown in Table 1. The polymeric fluorescent substances 1 to 6 and 9 to 10 exhibited an endothermic peak at the temperature higher than that of the polymeric fluorescent substance 7 as shown in Table 1.

TABLE 1

|  |  | Quantum yield of fluorescence (arbitrary unit) | Softening temperature (° C.) |
|---|---|---|---|
| Example 1 | Polymeric fluorescent substance 1 | 9.4 | 45.6 |
| Example 2 | Polymeric fluorescent substance 2 | 10.5 | 57.7 |
| Example 3 | polymeric fluorescent substance 3 | 14.9 | 41.6 |
| Example 4 | Polymeric fluorescent substance 4 | 10.5 | 46.2 |
| Example 5 | Polymeric fluorescent substance 5 | 7.6 | 58.4 |
| Example 6 | Polymeric fluorescent substance 6 | 5.8 | 36.3 |
| Example 7 | Polymeric fluorescent substance 9 | 10.6 | 46.2 |
| Example 8 | Polymeric fluorescent substance 10 | 8.6 | 28.7 |
| Comparative example 1 | Polymeric fluorescent substance 7 | 7.8 | 9.8 |
| Comparative example 2 | Polymeric fluorescent substance 8 | 4.6 | 42.0 |

All polymeric fluorescent substances had strong fluorescence and high softening temperature, while the polymeric fluorescent substance 7 of Comparative Example 1 had strong fluorescence but low softening temperature and the polymeric fluorescent substance 8 of Comparative Example 2 had high softening temperature but weak fluorescence.

EXAMPLE 11

Production and Evaluation of Devices

On a glass substrate on which an ITO film was built up in a thickness of 280 nm by an EB deposition method, a film was formed in a thickness of 70 nm using a 1.0 wt % chloroform solution of poly(N-vinylcarbazole) by a dipping method. Furthermore, a film was formed in a thickness of 40 nm using a 1.0 wt % toluene solution of the polymeric fluorescent substance 1 by a spin coating method. After drying under reduced pressure at 120° C. for 1 hour, tris(8-quinolinol) aluminum ($Alq_3$) was deposited to form the electron transporting layer in a thickness of 50 nm thereon in a rate of 0.1 to 0.2 m/second. Furthermore, a lithium-aluminum alloy (lithium concentration: 1% by weight) was deposited to form the cathodein a thickness of 50 nm thereon to produce an organic EL device. The vacuum degree was not more than $8×10^{-6}$ Torr during the deposition.

According to the same manner as that described above except for using the polymeric fluorescent substances 2 to 6 and 9 to 10 in place of the polymeric fluorescent substance 1, an organic EL device was produced, respectively. All of the resulting devices emitted bright green light by applying a voltage. The EL peak wavelength nearly agreed with a fluorescence peak wavelength of each polymeric fluorescent thin film, and EL light emission from the polymeric fluorescent substance was recognized. The light emitting efficiency and maximum luminance of each device are shown in Table 2. The luminance was approximately in proportional to the current density.

TABLE 2

|  |  | Light emitting efficiency (cd/A) | Maximum luminance (cd/m²) |
|---|---|---|---|
| Example 1 | Polymeric fluorescent substance 1 | 3.45 | 13344 |
| Example 2 | Polymeric fluorescent substance 2 | 2.24 | 13908 |
| Example 3 | polymeric fluorescent substance 3 | 4.44 | 20760 |
| Example 4 | Polymeric fluorescent substance 4 | 3.20 | 19260 |
| Example 5 | Polymeric fluorescent substance 5 | 2.37 | 10352 |
| Example 6 | Polymeric fluorescent substance 6 | 2.20 | 13028 |
| Example 7 | Polymeric fluorescent substance 9 | 4.24 | 16258 |
| Example 8 | Polymeric fluorescent substance 10 | 4.42 | 16122 |

EXAMPLE 12

Lifetime Characteristics of Device

Among the devices obtained in Example 11, the luminance half-lifetime and voltage increasing rate in case of driving the device using the polymeric fluorescent substance 1 of Example 1 at a constant current of 25 mA/cm² under nitrogen atmosphere are shown in Table 3. According to the same manner as that described in Example 11, a device using the polymeric fluorescent substance 7 of Comparative Example 1 was produced. The lifetime characteristics in case of driving under the same conditions are also shown in Table 3.

TABLE 3

|  | Luminance half-lifetime (hours) | Voltage increasing rate (V/hour) |
|---|---|---|
| Polymeric fluorescent 1 of Example 1 | 100 | 0.013 |
| Polymeric fluorescent 7 of Comparative example 1 | 100 | 0.060 |

A difference in luminance half-lifetime between the device using the polymeric fluorescent substance 1 and the device using the polymeric fluorescent substance 7 was little, but the voltage increasing rate of the device using the polymeric fluorescent substance 1 was smaller than that of the device using the polymeric fluorescent substance 7. The device using the polymeric fluorescent substance 1 was superior.

The polymeric fluorescent substance of the present invention is excellent as a material for organic EL devices because of strong fluorescence and good thermal stability. Furthermore, an organic EL device using the polymeric fluorescent substance can be preferably used as a flat light source for back light or a device such as a flat panel display and the like because it is easily produced and exhibits excellent light emitting characteristics and a heat resistance.

What is claimed is:

1. A polymeric fluorescent substance having visible fluorescence in a solid state and a polystyrene-reduced number-average molecular weight of $10^3$ to $10^7$, which contains at least one repeating unit represented by the following formula (1) and at least another repeating unit represented by the following formula (3), wherein the sum of the repeating unit represented by the formula (1) is from 5 to 95 mol % of the total number of the repeating units, the sum of the repeating unit represented by the formula (1) and the repeating unit represented by the formula (3) is from 50 to 100 mol % of the total number of the repeating units, and a molar ratio of the sum of the repeating unit represented by the formula (1) to the sum of the repeating unit represented by the formula (3) is from 20:1 to 1:19

$$-Ar_1-CR_1=CR_2- \quad (1)$$

wherein $Ar_1$ represents an arylene group having 4 to 20 carbon atoms taking part in conjugated bonds and containing at least one substituent represented by the following formula (2) as a nuclear substituent, or a heterocyclic compound group having 4 to 20 carbon atoms taking part in conjugated bonds, and containing at least one substituent represented by the following formula (2) as a nuclear substituent; and $R_1$ and $R_2$ independently represent a group selected from the group consisting of hydrogen, an alkyl group having 1 to 20 carbon atoms, an aryl group having 6 to 20 carbon atoms, a heterocyclic compound group having 4 to 20 carbon atoms and a cyano group, $$-(X)_m-(CH_2)_n-Ar_2 \quad (2)$$

wherein $Ar_2$ represents a group selected from the group consisting of an aryl group having 4 to 20 carbon atoms taking part in conjugated bonds, a heterocyclic compound group having 4 to 20 carbon atoms taking part in the conjugated bonds, and an aliphatic cyclic hydrocarbon compound group having 6 to 20 carbon atoms constituting the ring; X represents O or S; m represents 0 or 1; and n represents an integer of 2 to 10, $$-Ar_3-CR_3=CR_4- \quad (3)$$

wherein $Ar_3$ represents an arylene group having 4 to 20 carbon atoms taking part in conjugated bonds or a heterocyclic compound group having 4 to 20 carbon atoms taking part in conjugated bonds; and $R_3$ and R4 independently represent a group selected from the group consisting of hydrogen, an alkyl group having 1 to 20 carbon atoms, an aryl group having 6 to 20 carbon atoms, a heterocyclic compound group having 4 to 20 carbon atoms and a cyano group.

2. An organic electroluminescence device comprising a pair of an anode and a cathode, of which at least one electrode is transparent or semitransparent, and at least one light emitting layer formed between the electrodes, wherein said light emitting layer comprises the polymeric fluorescent substance of claim 1.

3. An organic electroluminescence device according to claim 2, wherein a layer of an electron transporting compound is provided adjacent to the light emitting layer between the cathode and the light emitting layer.

4. An organic electroluminescence device according to claim 2, wherein a layer of a hole transporting compound is provided adjacent to the light emitting layer between the anode and the light emitting layer.

5. An organic electroluminescence device according to claim 2, wherein a layer of an electron transporting compound is provided adjacent to the light emitting layer between the cathode and the light emitting layer and, furthermore, a layer of a hole transporting compound is provided adjacent to the light emitting layer between the anode and the light emitting layer.

* * * * *